United States Patent
Eby et al.

(10) Patent No.: US 7,014,802 B1
(45) Date of Patent: Mar. 21, 2006

(54) METHODS TO MAKE A SURFACE COVERING HAVING A NATURAL APPEARANCE

(75) Inventors: John M. Eby, Pennsville, NJ (US); Hao A. Chen, Chadds Ford, PA (US); Alonzo M. Burns, Jr., Mauricetown, NJ (US)

(73) Assignee: Mannington Mills, of Delaware, Inc., Wilmington, DE (US)

( * ) Notice: Subject to any disclaimer, the term of this patent is extended or adjusted under 35 U.S.C. 154(b) by 0 days.

(21) Appl. No.: 09/287,631

(22) Filed: Apr. 7, 1999

Related U.S. Application Data

(63) Continuation of application No. 08/996,701, filed on Dec. 23, 1997, now Pat. No. 5,961,903.
(60) Provisional application No. 60/039,534, filed on Feb. 20, 1997.

(51) Int. Cl.
*B29C 44/06* (2006.01)

(52) U.S. Cl. .................. 264/46.5; 156/79; 264/45.1; 264/46.4; 264/52; 264/250; 264/293
(58) Field of Classification Search ............... 264/46.4, 264/46.5, 293, 250, 52, 45.1; 156/179
See application file for complete search history.

(56) References Cited

U.S. PATENT DOCUMENTS

| | | |
|---|---|---|
| 3,293,094 A | 12/1966 | Nairn et al. |
| 3,293,108 A | 12/1966 | Nairn et al. |

(Continued)

FOREIGN PATENT DOCUMENTS

| | | |
|---|---|---|
| CA | 1011638 | 6/1977 |
| EP | 0 003 965 A1 | 9/1979 |

(Continued)

OTHER PUBLICATIONS

Printout of Patent Family related to Shortway et al. U.S. Patent No. 4,214,028.
Armstrong's Brief in Reply to Plaintiff's Answering Brief in Support of Opposition to Defendant's Motion to Bifurcate and Order Separate Trial on Patent Validity on Jul. 25, 2001 (Civil Action No. 00–876).
Letter from Mr. Louis Mathieu to Mr. Courtoy of Domco, Inc. dated Dec. 20, 1999.
PCT/US98/27264 Search Report mailed Aug. 31, 1999.
Stork X–Cell brochure. (undated).

(Continued)

*Primary Examiner*—Allan R. Kuhns
(74) *Attorney, Agent, or Firm*—Finnegan, Henderson, Farabow, Garrett & Dunner, L.L.P.

(57) ABSTRACT

A method for making a surface covering is disclosed which includes providing a surface covering having a backing layer, a foamable layer, and a design layer, wherein the design layer includes a portion of a pattern printed with at least one retarder composition. A wear layer is then provided on the design layer and the wear layer is cured. The foamable layer is thereby expanded to form a foam layer, and the pattern printed with at least one retarder composition is chemically embossed. The cured product is subsequently cooled to ambient temperature and then the top surface of the wear layer is subjected to a sufficient temperature to soften the wear layer. After being softened the wear layer is mechanically embossed with a surface texture, the embossed surface texture is set in the wear layer, and a top coat may then be provided on the embossed set wear layer. A surface covering having the various features described above is also disclosed. Preferably, the surface covering and the method for making the surface covering have a natural wood, stone, marble, granite, or brick appearance wherein the design layer includes one or more joint or grout lines created with at least one retarder composition and the wear layer is mechanically embossed with the surface texture of a wood, stone, marble, granite, or brick surface.

20 Claims, 3 Drawing Sheets

U.S. PATENT DOCUMENTS

| | | |
|---|---|---|
| 3,365,353 A | 1/1968 | Witman |
| 3,458,337 A | 7/1969 | Rugg |
| 3,655,312 A | 4/1972 | Erb et al. |
| 3,660,187 A | 5/1972 | Shortway et al. |
| 3,773,545 A | 11/1973 | Erb et al. |
| 3,804,657 A | 4/1974 | Eyman et al. |
| 3,844,814 A | 10/1974 | Bettoli et al. |
| 3,870,591 A | 3/1975 | Witman |
| 3,887,678 A | 6/1975 | Lewicki, Jr. |
| 3,916,046 A | 10/1975 | Youngberg |
| 3,953,639 A | 4/1976 | Lewicki, Jr. |
| 3,962,507 A | 6/1976 | McCreary et al. |
| 3,978,258 A | 8/1976 | Faust et al. |
| 4,005,239 A | 1/1977 | Davis et al. |
| 4,016,130 A | 4/1977 | Antczak |
| 4,022,643 A | 5/1977 | Clark |
| 4,089,731 A | 5/1978 | Lewicki, Jr. |
| 4,137,357 A | 1/1979 | Emmons |
| 4,142,849 A | 3/1979 | Lewicki, Jr. et al. |
| 4,181,283 A | 1/1980 | Rizzo |
| 4,187,131 A | 2/1980 | Shortway et al. |
| 4,187,338 A | 2/1980 | Miura |
| 4,196,243 A | 4/1980 | Sachs et al. |
| 4,214,028 A | 7/1980 | Shortway et al. |
| 4,217,385 A | 8/1980 | Shortway et al. |
| 4,230,759 A | 10/1980 | Kauffman et al. |
| 4,241,125 A | 12/1980 | Canning et al. |
| 4,248,922 A | 2/1981 | Shortway et al. |
| 4,264,643 A | 4/1981 | Granata et al. |
| 4,273,819 A | 6/1981 | Schmidle et al. |
| 4,278,483 A | 7/1981 | Mansolillo |
| 4,303,695 A | 12/1981 | McCann et al. |
| 4,310,370 A | 1/1982 | Arai et al. |
| 4,363,271 A | 12/1982 | Horst |
| 4,379,553 A | 4/1983 | Kelly |
| 4,390,580 A | 6/1983 | Donovan, deceased et al. |
| 4,395,459 A | 7/1983 | Herschdorfer et al. |
| 4,409,280 A | 10/1983 | Wiley et al. |
| 4,443,577 A | 4/1984 | Higgins et al. |
| 4,451,605 A | 5/1984 | Theodore |
| 4,501,790 A | 2/1985 | Aizawa et al. |
| 4,520,062 A | 5/1985 | Ungar et al. |
| 4,526,823 A | 7/1985 | Farrell et al. |
| 4,528,231 A | 7/1985 | Lund |
| 4,529,650 A | 7/1985 | Martinez |
| RE32,152 E | 5/1986 | Scher et al. |
| 4,588,545 A | 5/1986 | Kauffman et al. |
| 4,617,222 A | 10/1986 | Courtoy et al. |
| 4,689,102 A | 8/1987 | Prawdzik et al. |
| 4,698,258 A | 10/1987 | Harkins, Jr. |
| 4,747,901 A | 5/1988 | Becker et al. |
| 4,756,951 A | 7/1988 | Wang et al. |
| 4,816,314 A | 3/1989 | Prawdzik et al. |
| 4,863,782 A | 9/1989 | Wang et al. |
| 4,869,954 A | 9/1989 | Squitieri |
| 4,871,596 A | 10/1989 | Kamiya et al. |
| 5,049,433 A | 9/1991 | Leotta |
| 5,077,112 A | 12/1991 | Hensel et al. |
| 5,091,258 A | 2/1992 | Moran |
| 5,112,671 A | 5/1992 | Diamond et al. |
| 5,167,705 A | 12/1992 | Coughlan |
| 5,188,876 A | 2/1993 | Hensel et al. |
| 5,256,465 A | 10/1993 | Martin et al. |
| 5,278,223 A | 1/1994 | Gruenewaelder et al. |
| 5,344,704 A | 9/1994 | O'Dell et al. |
| 5,395,673 A | 3/1995 | Hunt |
| 5,397,406 A | 3/1995 | Vaders et al. |
| 5,405,674 A | 4/1995 | Wang et al. |
| 5,425,986 A | 6/1995 | Guyette |
| 5,458,953 A | 10/1995 | Wang et al. |
| 5,478,878 A | 12/1995 | Nagaoka et al. |
| 5,487,939 A | 1/1996 | Phillips et al. |
| 5,679,721 A | 10/1997 | Courtoy et al. |
| 5,961,903 A | 10/1999 | Eby et al. |

FOREIGN PATENT DOCUMENTS

| | | |
|---|---|---|
| EP | 0 075 646 | 4/1983 |
| GB | 1 383 024 | 2/1975 |
| JP | 61-20422 | 5/1980 |
| JP | 63-33430 | 2/1988 |
| JP | 63-189441 | 8/1988 |
| JP | 1110123 | 4/1989 |
| JP | 8244060 | 9/1996 |
| WO | WO 84/00719 | 3/1984 |

OTHER PUBLICATIONS

Domco Aquaflor II brochure and invoices. (1987).

Abstract of Japanese Publication No. JP363009533A published Jan. 16, 1988.

Abstract of Japanese Publication No. JP402270537A published Nov. 5, 1990.

Defendant Reply Brief in Support of It's Motion for Partial Summary Judgment on the Issue of Validity filed by Armstrong World Industries, Inc., on Apr. 3, 2002.

Expert Report of Kenneth J. Faust filed May 30, 2002.

Expert Report of Jean–Francois Courtoy filed May 30, 2002.

Answering Brief in Support of Plaintiff's Opposition to Defendant's Motion to Bifurcate and Order Separate Trial on Patent Validity, including Attachment 1 with Exhibits A–D and Attachment 2, filed on Jul. 18, 2001.

Armstrong World Industries' First Discovery Request to Plaintiffs with Exhibits 1–7, filed by Armstrong World Industries, Inc., on Jul. 23, 2001.

Defendant's Response to Plaintiff's Requests for Admissions filed by Armstrong World Industries, Inc., on Sep. 28, 2001.

Defendant's Response to Plaintiff's Requests for Entry and Inspection of Defendant's Land filed by Armstrong World Industries, Inc., on Sep. 28, 2001.

Defendant's Responses and Objections to Plaintiffs' First Set of Requests for the Production of Documents and Things filed by Armstrong World Industries, Inc., on Sep. 28, 2001.

Defendant's Responses and Objections to Plaintiffs' First Set of Interrogatories filed by Armstrong World Industries, Inc., on Sep. 28, 2001. Armstrong's response to interrogatory 7 was designated as confidential by Armstrong pursuant to the stipulated protective order and has been redacted.

Notice of Correction of Typographical Error in Connection with Defendant's Response to Plaintiffs' Requests for Admissions filed by Armstrong World Industries, Inc., on Oct. 8, 2001.

Letter to Plaintiffs' Counsel, Michael McGurk from Defendants' Counsel William Capp dated Oct. 11, 2001, regarding Armostrong's Proposed Initial Document Production and Amendment to Mannington's Document Request No. 20 and Interrogatory No. 5.

Plaintiffs' Responses to Defendant's Corrected and Substituted First Set of Discovery Requests filed by Mannington Mills, Inc. and Mannington Mills of Delaware, Inc., on Oct. 17, 2001.

Letter from Plaintiffs' Counsel, Anthony Hartmann, to Defendants' Counsel William Capp, dated Nov. 12, 2001, concerning the conference call with Judge McKelvie of Nov. 7, 2001 and Armstrong's objections to Mannington's responses to the pending discovery requests.

Plaintiffs' Responses to Defendant's Second Set of Discovery Requests filed by Mannington Mills, Inc. and Mannington Mills of Delaware, Inc., filed on Nov. 21, 2001.

Letter from Defendants'counsel, Womble Carlyle Sandridge & Rice to Judge McKelvie (with attachments) dated Nov. 27, 2001.

Declaration of Masutoshi Hosoda, including Attachments 1–2, executed Nov. 12, 2001.

Certificate of Translation Accuracy, including Attachments 32–33, executed Nov. 12, 2001.

Plaintiffs' Responses to Defendant's Third Set of Discovery Requests filed by Mannington Mills, Inc. and Mannington Mills of Delaware, Inc., on Dec. 3, 2001.

Amended and Supplemental Response to Plaintiffs' First Set of Interrogatories, including 17 sheets of attachments entitled "Exhibit A", filed by Armstrong World Industries, Inc., on Dec. 7, 2001. Armstrong's response to interrogatory 7 was designated as confidential by Armstrong pursuant to the stipulated protective order and has been redacted.

Complaint and Demand for Jury Trial filed by Mannington Mills, Inc. and Mannington Mills of Delaware, Inc., on Dec. 7, 2001.

Plaintiffs' Supplemental Responses to Defendant's Interrogatory Nos. 31–44, 106 & 131 filed by Mannington Mills, Inc. and Mannington Mills of Delaware, Inc., on Dec. 7, 2001.

Defendant's Responses and Objections to Plaintiffs' Second Set of Interrogatories filed by Armstrong World Industries, Inc., on Dec. 12, 2001.

Brief in Support of Defendant's Motion for Partial Summary Judgment on the Issue of Invalidity filed by Armstrong World Industries, Inc., on Dec. 31, 2001.

Defendant's Response to Plaintiffs' Second Set of Requests for Admission filed by Armstrong World Industries, Inc., on Jan. 9, 2002.

Defendant's Response to Plaintiffs' Third Set of Interrogatories filed by Armstrong World Industries, Inc., on Jan. 9, 2002.

Defendant's Response to Plaintiffs' Second Set of Requests for the Production of Documents and Things filed by Armstrong World Industries, Inc., on Jan. 9, 2002.

Plaintiffs' Responses to Defendant's Fourth Set of Discovery Requests and Supplemental Response to Defendant's Discovery Request No. 48 filed by Mannington Mills, Inc. and Mannington Mills of Delaware, Inc., on Jan. 14, 2002.

Amended Complaint and Demand for Jury Trial, including Exhibits A–C, filed by Mannington Mills, Inc. and Mannington Mills of Delaware, Inc., on Jan. 18, 2002.

Plaintiffs' Response to Defendant's Fifth Discovery Request filed by Mannington Mills, Inc. and Mannington Mills of Delaware, Inc., on Feb. 5, 2002.

Plaintiff's Complaint and Demand for Jury Trial filed by Domco Tarkett Inc., on Jun. 8, 2001.

Defendant's Answer to Plaintiff's Complaint and Demand for Jury Trial filed by Mannington Mills, Inc., and Mannington Mills of Delaware, Inc., on Sep. 26, 2001.

Defendant's Response to Plaintiff's First Set of Interrogatories Trial filed by Mannington Mills, Inc. and Mannington Mills of Delaware, Inc., on Jan. 7, 2002.

Defendant's Response to Plaintiff's First Request for the Production of Documents and Things filed by Mannington Mills, Inc. and Mannington Mills of Delaware, Inc., on Jan. 7, 2002.

Defendant's Response to Plaintiff's First Request for Admissions filed by Mannington Mills, Inc. and Mannington Mills of Delaware, Inc., on Jan. 7, 2002.

Plaintiff's Responses to Defendants' First Set of Requests for Admissions filed on Jan. 22, 2002.

Plaintiff's Responses to Defendants' First Set of Interrogatories filed by Domco Tarkett, Inc., on Jan. 22, 2002.

Plaintiff's Responses to Defendants' First Set of Requests to Plaintiff for the Production of Documents and Things filed by Domco Tarkett, Inc., on Jan. 22, 2002.

English Language Abstract for Japanese Appl. JP 85050584 (Nov. 9, 1985).

English Language Abstract for Japanese Appl. JP 75034082 (Nov. 6, 1975).

English Language Abstract for Japanese Appl. JP 85004307 (Feb. 2, 1985).

Toli Cushion Floor Brochure (CF–P Sheet) p. 1–52 (1994–1995).

METHODS TO MAKE A SURFACE COVERING HAVING A NATURAL APPEARANCE

This is a continuation of application Ser. No. 08/996,701, filed Dec. 23, 1997, now U.S. Pat. No. 5,961,903 and claims the benefit of U.S. provisional application No. 60/039,534, filed Feb. 20, 1997, all of which are incorporated herein by reference.

BACKGROUND OF THE INVENTION

1. Field of the Invention

The present invention relates to surface coverings, particularly surface coverings having a natural appearance. The present invention further relates to methods of making these types of surface coverings.

2. Description of the Related Art

A growing consumer preference for natural materials or "looks" simulated to natural wood, stone, marble, brick, and granite now exists for all types of surface coverings such as flooring. The perception of natural flooring, for instance, at an inexpensive price provides a high value, acceptable style, and luxury appearance.

The natural look of resilient vinyl floorings, for instance, made by gravure printing in conjunction with chemical embossing technology, does not quite impart the realistic appearance of true wood, stone, and the like. The subtle texture of wood grains and stone cannot be achieved by chemical embossing technology which develops the texture by reacting the inhibitor in the ink with a blow agent added in a pre-gel layer under heat and during a fusion process. In general, the texture created by the chemical embossing technique does not have a well-defined sharpness of real, natural products. In other words, chemical embossing has the disadvantage of being capable of making only rounded edges and there is great difficulty in controlling the depth of the embossing. In addition, this process leads to a texture which is too deep to be realistic. Mechanical embossing, on the other hand, is capable of reproducing the subtile, sharp, and shallow textures of natural wood, stone, marble, brick, etc. However, embossing in register with the printed design is very difficult with mechanical embossing.

Accordingly, there is a need for surface coverings having a realistic, natural "look" or appearance of wood, stone, marble, granite, or brick and methods of making the same.

SUMMARY OF THE INVENTION

A feature of the present invention is to provide a surface covering having a design, such as, for example natural wood, stone, marble, granite, or brick, appearance which is realistic in appearance. A further feature of the present invention is to provide a method of making such a surface covering.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description including the appended claims.

To achieve these and other advantages and in accordance with the purpose of the present invention, as embodied and broadly described herein, the present invention relates to a surface covering having a backing layer and a foam layer located on top of the backing layer. Further, a design layer having a design is located on top of the foam layer. At least one element of the design on the design layer is chemically embossed. A wear layer, located on top of the design layer, is mechanically embossed with a surface texture when the wear layer is in a softened state. The foam layer may or may not be mechanically embossed. Finally, a top coat may be located on top of the embossed wear layer.

The present invention further relates to a surface covering having a natural wood, stone, marble, granite, or brick appearance. This surface covering has a backing layer, a foam layer located on top of the backing layer, and a design layer. The design layer has a design of wood, stone, marble, granite, or brick. This design layer is located on top of the foam layer and the design has chemically embossed joint or grout lines, which simulate such features found in natural surfaces where wood, stone, marble, granite, or brick are formed as surfaces for floors, for example. In addition, a wear layer, located on top of the design layer, is mechanically embossed with a surface texture of natural wood, stone, marble, granite, or brick after the wear layer has been softened. The foam layer may or may not be mechanically embossed. Finally, a top coat may be located on top of the embossed wear layer.

The present invention also relates to a method for making a surface covering, preferably having a natural wood, stone, marble, granite, or brick appearance. The method includes the steps of providing a surface covering having a backing layer, a foamable layer located on top of the backing layer, and a design layer located on top of the foamable layer. The design layer preferably has a design of a wood, stone, marble, granite, or brick. A portion of the design in the design layer is printed with a retarder composition. In the preferred embodiment, the design that is printed with the retarder composition is joint or grout lines. A wear layer is then provided on top of the design layer and subjected to curing to cure the wear layer and expand the foamable layer, thus chemically embossing areas which have been printed with the retarder composition. For purposes of the present invention, "curing" is also known in the art as "fusing." After curing the wear layer, it is permitted to obtain ambient temperature. This cooled product is then subjected to a sufficient temperature to soften the cured wear layer, preferably by heating the top suface of the cured and cooled wear layer. After it has been softened, the wear layer is mechanically embossed while it is in the softened state. In particular, the wear layer is mechanically embossed with a surface texture, for example, of wood, stone, marble, granite or brick and the foam layer may or may not be mechanically embossed depending on the embossed design and the pressure applied to the wear layer.

In the preferred embodiment of the invention, the chemical embossing of the joint or grout lines is deeper than that of the portions of the surface covering which have only been mechanically embossed. In this way, the surface texture created by the mechanical embossing is limited to the raised areas. These raised areas are the design elements of wood, stone, marble, granite, or brick, which are joined together by the joint or grout lines. Thus, the surface covering of the invention, which does not include mechanically embossed surface texture in the joint or grout lines, has the appearance of mechanical embossing in register, but is created without the technical difficulties associated with registering mechanical embossing. Finally, in the preferred embodiment, a top coat is provided on top of the embossed wear layer.

It is to be understood that the foregoing general description and the following detailed description are exemplary and explanatory only and are intended to provide further explanation of the present invention, as claimed.

BRIEF DESCRIPTION OF THE DRAWINGS

This invention will be described in greater detail with reference to the drawings in which.

DETAILED DESCRIPTION OF THE PRESENT INVENTION

Generally, a surface covering can be made by the present invention which combines chemical embossing with mechanical embossing to form a unique product. Preferably, this product is a surface covering having a natural wood, stone, marble, granite, or brick appearance, though other surface coverings having the desired combination of chemical embossing and mechanical embossing as described herein form part of the present invention. For purposes of the present invention, surface covering includes, but is not limited to, flooring such as inlaid floors, hardwood floors, solid vinyl tiles, homogeneous floors, cushioned floors, and the like; wall paper; laminates; and countertops.

Figure 2:
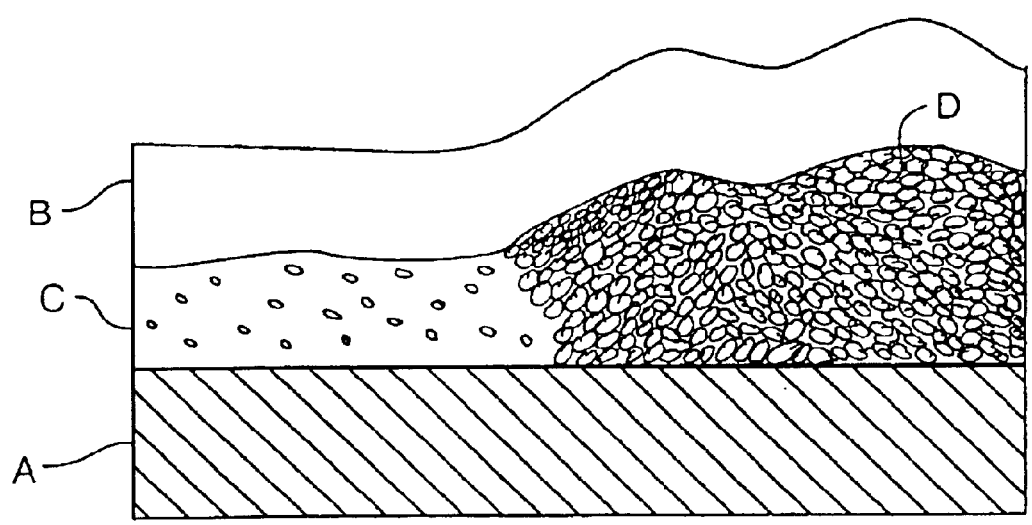
FIG. 2 is a fragmentary, cross-sectional view of the surface covering of the present invention depicting the multiple layers in detail.

In making the surface covering, a backing layer or substrate A is provided and a foamable layer C and D is formed or placed on top of backing layer A as shown in FIG. 2. A design or print layer B is applied, adhered, or located on top of the foamable layer as seen in FIG. 2. The design layer B has a design (not shown) and a portion of this design is formed with a retarder composition, such as, but not limited to, a retarder ink. Preferably, the portion of the design is in the shape and form of one or more joint or grout lines (not shown) which simulate, for instance, the joint lines between two strips of wood forming a surface covering or the joining of stones, marble, granite, or brick by mortar or grout lines between each stone, marble, granite, or brick.

Once the design layer B is applied, a wear layer is applied or located on top of the design layer and the surface covering, and the wear layer is then cured such as by subjecting the surface covering to heat to form a cured wear layer. This curing process will also chemically emboss areas of the design layer where the retarder ink has been applied. In the preferred embodiment, the chemically embossed areas are the printed joint or grout lines. Any heating means can be used, such as a gas-fired forced-hot-air oven. The product is then permitted to obtain ambient temperature, such as by cooling. Afterwards, the surface of the product is subjected to a sufficient temperature to soften the cured wear layer surface, for instance, through re-heating, preferably by infrared radiant heat. This softens the surface in order to enable the product to receive the mechanical embossing. The wear layer is then mechanically embossed to have a surface texture. Any surface texture can be embossed onto the wear layer. Preferably, the surface texture simulates or has a wood, stone, marble, granite, or brick surface texture. During mechanical embossing, the foam layer may or may not be mechanically embossed. It is preferred that the foam layer is slightly embossed. In particular, in a preferred embodiment, the portions of the wear layer being mechanically embossed will compress or lose from about 1 to about 4 mils in thickness while the portions of the foam layer in contact with these portions will compress or lose from about 1 to about 5 mils in thickness. In this preferred embodiment, the total embossing depth of wear layer and foam layer combined is between about 3 mils and about 8 mils. Preferably, the foam cells within the foam layer are not crushed or collapsed in the embossed areas, but may be flattened or distorted as shown in D in FIG. 2.

A top coat (not shown in FIG. 2) may then be provided on top of the embossed wear layer to form the surface covering.

The backing layer used in the present invention can be any conventional backing layer used in surface coverings such as a felted or matted fibrous sheet of overlapping, intertwined filaments and/or fibers, usually of natural, synthetic, or man-made cellulosic origin, such as cotton or rayon, although many other forms of sheets, films, textile materials, fabrics, or the like, may be used. The substrate or backing layer can be non-foamed, non-crosslinked vinyl compositions as well. The thickness of a conventional substrate layer is generally not critical and it is preferably from about 2 to about 100 mils, more preferably from about 15 to about 30 mils.

The foamable layer used in the present invention can be any conventional foamable layer used in surface coverings, such as a foam layer used in flooring. In particular, the foamable layer can be any suitable material known in the art for producing foam layers such as polyvinyl chloride plastisol or organosol. Alternatively, and preferably, the foam layer is a resilient, cellular foam layer which can be formed from a resinous composition containing a foaming or blowing agent that causes the composition to expand on heating. It is also known in the art that foamable, resinous sheet material can be selectively embossed by controlling the decomposition temperature of a catalyzed blowing or foaming agent in the heat-expandable composition. For example, by applying to the heat-expandable composition a reactive chemical compound which is referred to in the art as a "regulator," "inhibitor," or "retarder," it is possible to modify the decomposition temperature of the catalyzed foaming or blowing agent in the area of application of the reactive compound. It is thus possible to produce sheet materials having surface areas that are depressed with inhibitor application and raised proximate the area without inhibitor application.

The inhibitor or retarder can be conveniently incorporated in an inhibitor or retarder composition, preferably in a foam-retarding, printing ink composition, which is printed over the heat-expandable resinous composition. Such compositions are well-known in the art and are generally based on an organic solvent carrier or vehicle system. Alternatively, and preferably, an aqueous retarder printing ink composition is used such as the one described in U.S. Pat. No. 5,169,435, incorporated in its entirety by reference herein. A most preferred aqueous retarder printing ink composition contains from about 20 to about 30% by weight acrylic resin binder, from about 6.5 to about 17% by weight tolyltriazole, from about 20 to about 30% by weight alcohol, and from about 35 to about 50% by weight water. Foaming or blowing agent modifiers or inhibitors other than tolyltriazole can also be used including but not limited to benzotriazole, fumaric acid, malic acid, hydroquinone, dodecanethiol, succinic anhydride or adipic acid. Additionally, other foam-retarding, printing ink compositions can also be used, such as those described in U.S. Pat. Nos. 4,191,581 and 4,083,907 to Hamilton; U.S. Pat. No. 4,407,882 to Houser; and U.S. Pat. No. 5,336,693 to Frisch, all incorporated in their entirety by reference herein.

In the present invention, for purposes of creating the foamable layer, which is chemically embossed, a substrate comprising an expandable resinous layer containing a foaming or blowing agent is provided. A printed design is provided over at least a portion of the expandable resinous layer. At least a portion of this printed design comprises a retarding composition. As will be described in further detail below, once a wear layer is applied on top of the foamable layer, the expandable resinous layer (e.g., the foamable layer) is then subjected to a sufficient temperature for a sufficient time to expand the layer and thereby form an embossed region of the layer proximate the portion of the printed design that contained the foaming or blowing agent modifier or inhibitor. Generally, a sufficient temperature is from about 195° C. to about 215° C. and for a time of from about 2.5 minutes to about 3.0 minutes to create the foam layer.

Prior to subjecting the expandable resinous layer and design layer to heat, a wear layer is deposited or applied on top of the design layer and the layers, along with the substrate, are subjected to heat or curing which will not only cure the wear layer, but also expand the resinous layer and cause chemical embossing as described earlier.

The portion of the design layer which does not comprise at least one retarder composition is formed by non-retarder ink compositions. An example of such an ink composition contains an acrylic resin, water, alcohol, and one or more pigments. In forming a design having both a retarder composition and one not containing a retarder composition, such a design can be done in register using multiple station rotogravure printing. As indicated earlier, in the preferred embodiment of the present invention, a design layer contains a pattern of joint or grout lines which are created with at least one retarder composition. Upon expansion of the foamable layer, these portions will be chemically embossed and will visually form joint or grout lines to simulate such lines which exist with natural wood, stone, marble, granite, or brick surfaces. The joint or grout lines created with the retarder composition generally will have a width of, for example, from about 1/16 inch to about 1/4 inch.

The wear layer can be made of any suitable material known in the art for producing such wear layers. Preferably, the wear layer is a transparent poly(vinyl chloride) layer. The dry film thickness of this PVC layer is not critical and it is preferably from about 5 mils to 50 mils, and more preferably from about 10 mils to about 20 mils. Other examples of this wear layer include, but are not limited to, acrylic polymer, polyolefins, and the like.

As indicated, this wear layer is applied to and adhered to the foamable layer. Means to apply the wear layer to the foamable layer are known in the art and include, but are not limited to, a reverse-roll coater. Once the wear layer is applied to the top of the foamable layer, the wear layer is cured. This curing can be accomplished by subjecting the wear layer along with the foamable layer and substrate to a sufficient temperature, e.g., by heating, to cure the wear layer in a multi-zone gas-fired hot air oven essentially as described in U.S. Pat. No. 3,293,108. Also, the curing or heating step will expand the foamable layer to form the foam layer which will have chemically embossed areas. For purposes of curing the wear layer, a sufficient temperature for a sufficient time would be used and known to those skilled in the art. Preferably, this temperature is from about 195° C. to about 215° C. for a time of from about 2.0 minutes to about 3.0 minutes, more preferably about 2.0 minutes to about 2.2 minutes.

Once the wear layer is cured, it is preferred to permit the wear layer to obtain an ambient temperature, such as by passing it over a series of water-cooled drums or "cans" essentially as described in U.S. Pat. No. 3,293,108. The wear layer is then subjected to a sufficient temperature for a sufficient time in order to soften the wear layer to a sufficient degree to allow it to be mechanically embossed. The surface temperature of the wear layer for purposes of mechanically embossing it is preferably from about 145° C. to about 160° C. depending on, among other things, the color of the printed design under the wear layer surface. The mechanical embossing of the wear layer can be achieved in such a manner that the foam layer beneath the wear layer may or may not be mechanically embossed. In any event, the portion of the the foam layer which has been overlayed with the design layer having the retarder composition is not mechanically embossed. And, the portions or areas of the foam layer beneath the areas or portions of the wear layer that are embossed are generally slightly embossed. For purposes of the present invention, any embossing technique known to those skilled in the art can be used; for example, the product can be fed through a nip between an engraved steel embossing roll and a rubber back-up roll, such that the face of the wear layer is in contact with the engraved steel roll. See FIG. 1. The embosser gap can "float" against a fixed pressure, or more preferably the embosser gap can be "fixed" by adjustable steel "wedge blocks" for example. However, the fixed gap approach requires that careful attention be paid to maintaining consistent caliper of the product prior to entry into the embosser section of the process. The preferred starting point for the fixed gap is 60% of the specific product caliper. Fine-tuning adjustments can then be made to achieve the specified appearance. Furthermore, in order to maintain faithful reproduction of the embossing roll engraving in the embossed surface covering, it is advantageous to maintain some positive tension or "draw" on the web as it enters the nip. This tension also helps to keep the web tracking straight.

For purposes of mechanical embossing, generally, the pressure applied to the wear layer is sufficient to create an embossing of, for example, from about 1 mil to about 12 mils, more preferably from about 3 mils to about 8 mils. As indicated earlier, in the preferred embodiment of the present invention, the chemical embossing of the joint or grout lines is deeper than that of the portions of the surface covering which have only been mechanically embossed. This process, which does not create the mechanically embossed surface texture in the joint or grout lines, imparts to the surface covering the appearance of mechanical embossing in register.

It is certainly within the bounds of the present invention to use several devices to mechanically emboss different textures onto the wear layer. In the preferred embodiment of the present invention, the device used to mechanically emboss will have a pattern that will simulate the surface texture of wood, stone, marble, granite, or brick and this texture will be transferred onto the wear layer.

Figure 1:
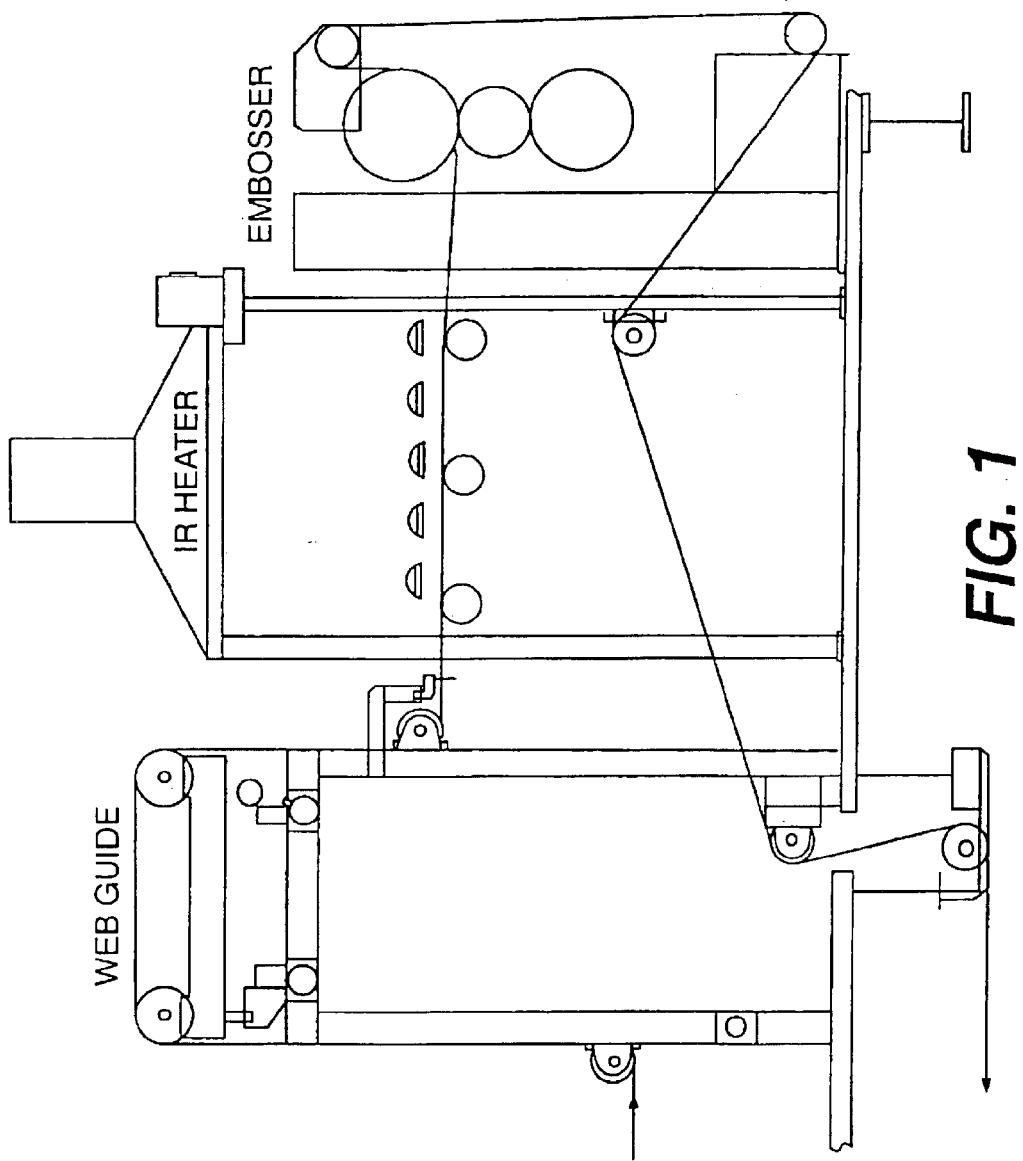
FIG. 1 depicts a side view of the apparatus for embossing the surface covering of the present invention.

In accordance with the invention and as shown in FIG. 1, a cured, foamed and cooled surface covering is processed as follows to produce a surface having a "natural" appearance. A web of cooled cushioned covering is passed through the "WEB GUIDE" at the point indicated by the entry arrow. This "WEB GUIDE" is provided to insure that the web tracks straight through the embosser nip. After exiting the "WEB GUIDE", the web passes under the five burners of the "IR HEATER". The heat output of the "IR HEATER" is adjusted as necessary to properly heat the surface of the web by adjusting the height of the burners above the web, and by adjusting the gas flow to the burners. From the "IR HEATER" the web proceeds to the "EMBOSSER". The hot surface of the web contacts an engraved steel embossing roll. The embossing nip, mentioned above, consists of this engraved steel embossing roll and a rubber bed roll, which contacts the back surface of the web. The rubber bed roll is provided with a steel back-up roll which can be used, if necessary, to counteract any tendency of the rubber roll to "bow" downward. The web is maintained in contact with the water-cooled embossing roll for about 90 degrees of wrap by means of the uppermost idler roll. This contact with the cooled embossing roll surface removes some of the heat from the surface of the web by heat transfer from the web sheet to the water-cooled steel embossing roll, and thus "sets" the embossing. The dwell time is dependent on exact embossing roll circumference and line speed and can be easily determined by one skilled in the art. Approximate dwell time ranges are given for three possible web speeds in Table I below.

TABLE I

| Web Speed (ft./min.) | Dwell Time Range (seconds) |
|---|---|
| 48 | 1.6–1.8 |
| 60 | 1.3–1.4 |
| 70 | 1.1–1.2 |

The cooled embossed web is then directed back under the "IR HEATER" section of the apparatus. At the point indicated by the exit arrow, the web continues on to a final coating station (not shown) for applying a top-coat to the surface of the web as described below. The apparatus for this coating station is well known to those skilled in the art.

As indicated above, a critical feature of the invention is the surface temperature of the web at the exact instant when the web sheet enters the embossing roll nip. This temperature is dependent on the thickness of the layer, the speed of the moving web, and the exact position where the measurement is taken. However, this exact spot is not generally accessible for temperature measurements because of the diameter of the embossing roll. Normally, therefore, the reading is taken from the mid-point of the distance between the end of the IR heater and the embossing roll nip. The actual temperature as the web sheet enters the embossing roll nip will be lower than this reading because of heat loss from the web sheet surface as it moves through the space between the measurement point and the embossing roll nip. The faster the line speed, the less opportunity for heat loss and the closer the actual temperature will be to the measured temperature at the embossing nip.

A guide for temperature ranges based on web speed and layer thickness for vinyl is given below in Table II. It should be remembered, however, that the ability of a surface to absorb heat from IR energy is dependent, among other things, on the color of that surface. Thus, the exact temperature within the preferred range will depend on the predominate color of the sheet being embossed. Therefore, these conditions are starting conditions only, and fine tuning adjustments can be made as needed to achieve the product appearance specified by the "standard sample". In fact, in some instances, it may be necessary to operate outside the preferred ranges discussed above to achieve the product appearance specified by the "standard sample".

TABLE II

| clear vinyl caliper | web speed (ft./min.) | temperature range ° C. |
|---|---|---|
| .019" | 48 | 155–160 |
| .014" | 60 | 150–155 |
| .012" | 70 | 145–150 |

Once the wear layer is mechanically embossed, a top coat, also known as a wear layer top coat, is applied to the top and adhered to the embossed wear layer. The top coat can be composed of any suitable material known in the art for this purpose. Preferably, the top coat is a urethane top coat. Once the top coat is applied, the overall surface covering containing all of the layers is cured. Preferably, the top coat has a thickness of from about 0.5 mil to about 2.0 mils, more preferably, from about 0.9 mil to about 1.3 mils.

Optionally, besides the layers discussed above, one or more additional layers can be present, such as the layers described in U.S. Pat. No. 5,458,953, incorporated in its entirety by reference herein. Such additional layers include strengthening layers, additional foamable layers, and a wear layer base coat. The composition of these layers and their locations are described in U.S. Pat. No. 5,458,953 and can be used in the surface covering of the present invention.

Figure 3:
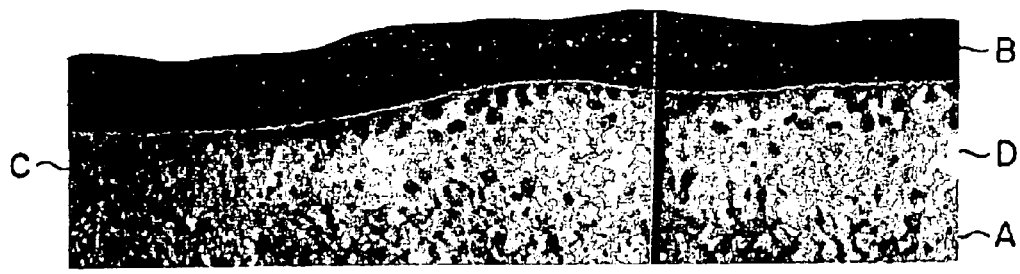
FIG. 3 is a microscope photograph of the surface covering of the present invention.

As indicated earlier, the present invention also relates to a surface covering as seen in the photograph of FIG. 3. This surface covering has a backing layer A, a foam layer C and D applied on top and adhered or attached to the backing layer. A design layer B having a design is printed on the foam layer. At least a portion of the design layer includes a chemically embossed pattern. Preferably, this chemically embossed pattern is in the shape and form of joint or grout lines as previously described. A wear layer is applied on top of the design layer and this wear layer is mechanically embossed with a surface texture. The foam layer C and D may or may not be mechanically embossed. The surface texture is preferably the texture of wood, stone, marble, granite, or brick. Finally, a top coat or wear layer top coat (not shown in FIG. 3) is applied on top of and adhered to the embossed wear layer. The details of each of these components is described above.

As also indicated, additional optional layers such as those described in U.S. Pat. No. 5,458,953 can be incorporated into this surface covering. Such additional optional layers include a strengthening layer, a wear layer base coat, and/or additional foam layers.

The present invention will be further clarified by the following examples, which are intended to be purely exemplary of the present invention.

EXAMPLE 1

A cushioned vinyl floor covering having a backing, a foam layer with a chemically embossed texture in the foam, and a clear vinyl layer was prepared essentially as described in U.S. Pat. No. 3,293,108, herein incorporated by reference in its entirety.

The backing was a felted fibrous sheet of the type that is customarily used for substrate layer in this type of floor covering. In this example, the backing thickness was 0.025 inches (±0.001 inches). The foam layer was formed from a plasticized polyvinyl chloride composition containing a foaming or blowing agent. The foamable PVC plastisol had been solidified or "gelled" by heating. A design was printed on the surface of the solidified PVC composition, using pigmented inks such as are customarily used in this process. One or more of the inks contained a reactive chemical compound commonly referred to as a "retarder." Detailed information concerning the chemical retardation of chemically foamed PVC plastisols, as well as an example of formulations for both plastisols and inks, can be found in a journal article by Andrew Hunter, "Cellular Polymers," Vol. 2, pp. 241–249 (1983) (Applied Science Publishers, Ltd., Essex, England), herein incorporated by reference in its entirety. In this example, the foam layer was 0.035 inches (±0.003) thick in the areas that were not chemically retarded.

The clear vinyl layer was formed from a PVC plastisol which was coated onto the printed solidified ("gelled") foamable PVC composition following the printing of the design. The clear vinyl layer was cured, and the foamable vinyl composition foamed, by heat. During this operation, the chemical embossing was formed by action of the retarder chemical contained in certain inks. The heat was supplied by a multi-zone gas-fired hot air oven with zones operating between about 195° C. and about 215° C. Residence time in the oven was about 3 minutes. An example of a formulation for the clear vinyl can be found in the journal article by A. Hunter (cited above). In this example, the clear vinyl layer was 0.019 inches (±0.001 inches) thick. Furthermore, the areas that were printed with ink containing a retarder compound, specifically joint or grout lines, had chemical embossing that was a minimum of about 0.010 inches in depth.

The vinyl flooring material described above was cooled and then mechanically textured in the following manner.

The material was heated by passing it under a gas-fired infrared radiant heater delivering approximately 360 BTU/sq. ft./min.; at a product speed of 37 ft./min. (±2 ft./min.). The heater was positioned between about 3.5 inches and about 6.0 inches above the material surface, depending on the color of the decorative print. The ability of a surface to absorb heat from infrared energy is dependent on such factors as the color of the decorative print. As is well known in the art, the heat delivered by the gas-fired infrared heater described above can be fine-tuned by adjusting the gas-flow controls so that the sheet surface temperature is maintained within the preferred range as given below.

The surface temperature of the material exiting from the heater was approximately between 150° C. and 160° C., as measured by a non-contact IR pyrometer held approximately 12–18 inches from the material surface. The back surface of the substrate felt layer was approximately between 80° C. and 85° C., as measured by "stick-on" heat tape (for example, "Thermolable," supplied by Paper Thermometer Co., Inc. of Greenfield, N.H.).

The heated material was then passed through an embossing nip between an engraved steel roll and a rubber back-up roll. The nip was set at 0.050 inches (±0.005 inches) for the material described above. The nip opening was set by adjustable steel "wedge blocks." Clamping pressure was sufficient so that the nip opening did not vary ("float") while the material was passing through the nip.

The steel roll had an embossing texture engraved onto it by means that are well known in the art. The rubber back-up roll was approximately 90–95 durometer (Shore A). Both rolls were water-cooled such that the surface of the engraved steel roll was approximately 26° C. to 38° C., as measured by a contact thermocouple pyrometer.

Following the embossing nip, the material was directed by idler rolls so that it wrapped about one quarter of the engraved roll circumference. The additional contact of material against the water-cooled engraved roll was provided in order to cool the vinyl surface and "set" the embossed texture.

As the final step in preparing a surface covering having a "natural" appearance, the material was coated with a urethane acrylate top coat of the type that was cured by actinic radiation in the UV wavelength region.

The coating was applied to yield a cured thickness approximately between 0.0009 inches and 0.0012 inches. The application was such that the coating followed the embossing texture and did not significantly reduce the embossing depth of the texture. The embossing depth of the mechanical texture in the finished product was between about 0.003 inches and approximately 0.008 inches depending on the specific engraved roll used. However, regardless of the specific engraved roll used, there is no mechanically embossed surface texture in the chemically embossed areas because the minimum chemical embossing depth of about 0.010 inches is deeper than the maximum depth of the mechanically embossed surface texture of about 0.008 inches.

The surface gloss (or "shine") of actinic radiation cured acrylated urethane surface coatings can be varied in a controlled manner to produce the desired visual effect consistent with a "natural" appearance. In one specific example, the appearance of a printed brick design was made more natural by use of a coating with a flat panel 60 degree gloss of about 40 unit.

These actinic radiation cured acrylated urethane coatings are readily available from several commercial suppliers including, but not limited to, Lord Corporation, Erie, Pa.

EXAMPLE 2

A cushioned vinyl floor covering having a backing, a foam layer with a chemically embossed texture in the foam, and a clear vinyl layer was prepared as described in Example 1. This vinyl flooring material was cooled and then mechanically textured in the following manner.

The material was heated by passing it under a gas-fired infrared radiant heater delivering approximately 360 BTU/sq. ft./min.; at a product speed of 48 ft./min. (±2 ft./min.). The heater was positioned between about 3.5 inches and about 5.0 inches above the material surface, depending on the color of the decorative print. As is well known in the art, the heat delivered by the gas-fired infrared heater described above can be fine-tuned by adjusting the gas-flow controls so that the sheet surface temperature is maintained within the preferred range as given below.

The surface temperature of the material exiting from the heater was approximately between 155° C. and 160° C., as measured by a noncontact IR pyrometer held approximately 12–18 inches from the material surface. The back surface of the substrate felt layer was approximately between 80° C. and 85° C., as measured by "stick-on" heat tape (for example, "Thermolable," supplied by Paper Thermometer Co., Inc. of Greenfield, N.H.).

The heated material was then passed through an embossing nip between an engraved steel roll and a rubber back-up roll. The nip was set at 0.050 inches (±0.005 inches) for the material described above. The nip opening was set by adjustable steel "wedge blocks." Clamping pressure was sufficient so that the nip opening did not vary ("float") while the material was passing through the nip.

The steel roll had an embossing texture engraved onto it by means that are well known in the art. The rubber back-up roll was approximately 90–95 durometer (Shore A). Both rolls were water-cooled such that the surface of the engraved steel roll was approximately 26° C. to 38° C., as measured by a contact thermocouple pyrometer.

In order to maintain an embossed image that is an accurate reproduction of the engraved surface, a positive "draw" was maintained on the web using the embossing roll driver operated at a DC current flow of +6 amperes. This "draw" also assisted in maintaining proper alignment of the web tracking, and minimizing side-to side wandering.

Following the embossing nip, the material was directed by idler rolls so that it wrapped about one quarter of the engraved roll circumference. The additional contact of material against the water-cooled engraved roll was provided in order to cool the vinyl surface and "set" the embossed texture.

The final step of coating the material with a urethane acrylate top coat was performed as in Example 1 to yield a cured thickness approximately between 0.0009 inches and 0.0012 inches with an embossing depth of the mechanical texture in the finished product being between about 0.003 inches and approximately 0.008 inches depending on the specific engraved roll used.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a surface covering having multiple layers including a wear layer comprising:
   chemically embossing at least a portion of a first layer,
   subsequently mechanically embossing at least a portion of a second layer, wherein the first layer is disposed below the second layer and a chemically embossed portion of the first layer has a depth greater than any embossed portion of the second layer, and wherein said second layer is said wear layer, and
   applying said wear layer before chemical embossing.

2. The method according to claim 1, wherein the wear layer has uniform melt viscosity and is cured during chemical embossing.

3. The method according to claim 1, wherein the wear layer contains no reactive compounds that would lead to chemical embossing.

4. The method according to claim 1, wherein the mechanically embossed portion of the wear layer does not include the chemically embossed portion.

5. The method of claim 1, wherein said first layer comprises foam and the chemical embossing comprises the step of expanding said foam.

6. The method of claim 1, wherein said mechanical embossing occurs when said second layer is in a softened state.

7. The method of claim 1, wherein said first layer is a foam layer.

8. The method of claim 1, wherein the mechanical embossing achieves an emboss depth of about 1 to about 12 mils.

9. The method of claim 7, wherein the total embossing depth of the wear layer and foam layer combined is about 3 to about 8 mils.

10. The method of claim 7, wherein the foam layer comprises foam cells beneath the mechanically embossed portion of the wear layer which are not crushed or collapsed.

11. The method of claim 7, wherein at least a portion of the foam layer that is chemically embossed is not mechanically embossed.

12. A method of making a floor covering, comprising:
   a) providing a surface covering comprising a backing layer; a foamable layer; and a design layer containing at least one retarder composition in at least a portion thereof and in contact with said foamable layer;
   b) providing a wear layer and curing said wear layer, thereby expanding said foamable layer to form a foam layer and chemically embossing that portion of said foam layer in contact with said retarder composition; and
   c) subsequently mechanically embossing a surface texture onto said wear layer, wherein a chemically embossed portion of said foam layer has an emboss depth greater than the emboss depth of any portion of said mechanically embossed portion.

13. The method of claim 12, further comprising the step of softening said wear layer by subjecting it to a temperature sufficient to soften it prior to said mechanical embossing step.

14. The method of claim 13, further comprising the steps of curing and subsequently cooling said wear layer to reduce its temperature to approximately ambient temperature prior to said softening step.

15. The method of claim 13, wherein said softening step includes subjecting said wear layer to a sufficient softening temperature of about 195° C. to 215° C.

16. The method of claim 12, wherein the mechanical embossing achieves an emboss depth of about 1 to about 12 mils.

17. The method of claim 12, wherein the total embossing depth of the wear layer and foam layer combined is about 3 to about 8 mils.

18. The method of claim 12, wherein the foam layer comprises foam cells beneath the mechanically embossed portion of the wear layer which are not crushed or collapsed.

19. The method of claim 12, wherein at least a portion of the foam layer that is chemically embossed is not mechanically embossed.

20. The method according to claim 12, wherein the mechanically embossed portion of the wear layer does not include the chemically embossed portion.

* * * * *